(12) United States Patent
Jiang et al.

(10) Patent No.: US 10,846,917 B2
(45) Date of Patent: Nov. 24, 2020

(54) ITERATING DIFFERENT CAMERA REPRESENTATIONS IN THREE-DIMENSIONAL MODEL

(71) Applicant: Microsoft Technology Licensing, LLC, Redmond, WA (US)

(72) Inventors: Lingbing Jiang, Kirkland, WA (US); Emanuel Shalev, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/250,826

(22) Filed: Jan. 17, 2019

(65) Prior Publication Data

US 2020/0219308 A1 Jul. 9, 2020

Related U.S. Application Data

(60) Provisional application No. 62/788,069, filed on Jan. 3, 2019.

(51) Int. Cl.
*G06T 15/50* (2011.01)
*G06T 19/20* (2011.01)
*G06T 15/08* (2011.01)
*G06T 7/73* (2017.01)

(52) U.S. Cl.
CPC ............ *G06T 15/50* (2013.01); *G06T 7/75* (2017.01); *G06T 15/08* (2013.01); *G06T 19/20* (2013.01)

(58) Field of Classification Search
CPC ........... G06T 15/50; G06T 7/75; G06T 15/08; G06T 19/20
See application file for complete search history.

(56) References Cited

U.S. PATENT DOCUMENTS

| 6,028,606 | A  | 2/2000 | Kolb et al. |
| 7,901,093 | B2 | 3/2011 | Tan et al. |
| 7,952,583 | B2 | 5/2011 | Waechter et al. |
| 8,106,949 | B2 | 1/2012 | Tan et al. |

(Continued)

FOREIGN PATENT DOCUMENTS

| CN | 107665501 A | 2/2018 |
| JP | 2017138912 A | 8/2017 |
| WO | 9918542 A1 | 4/1999 |

OTHER PUBLICATIONS

"International Search Report and Written Opinion Issued in PCT Application No. PCT/US2019/067612", dated Apr. 2, 2020, 13 Pages.

*Primary Examiner* — Chong Wu
(74) *Attorney, Agent, or Firm* — Workman Nydegger (57) ABSTRACT

The evaluation of multiple virtual camera representations at the same point-of-view within a three-dimensional environment without recalculating a light travel transform that represents how light travels and reflects within the three-dimensional environment. These virtual camera representations may include a light capture transform that represents a transform from camera input to camera output. The virtual camera representation may also include a vision algorithm for interpreting the camera output. Thus, different virtual camera representations at the same point-of-view may be used to obtain a variety of representations of the three-dimensional environment at the same point-of-view.

20 Claims, 7 Drawing Sheets

(56) References Cited

U.S. PATENT DOCUMENTS

| | | |
|---|---|---|
| 9,654,745 B2 | 5/2017 | Zeng et al. |
| 9,667,887 B2 | 5/2017 | Katz et al. |
| 9,684,996 B2 | 6/2017 | Wang et al. |
| 9,704,283 B2 | 7/2017 | Ozdas et al. |
| 9,760,837 B1 | 9/2017 | Nowozin et al. |
| 2010/0245684 A1* | 9/2010 | Xiao .................. H04N 9/3147 348/745 |
| 2011/0018890 A1* | 1/2011 | Ford ..................... A63F 13/52 345/589 |
| 2015/0276591 A1 | 10/2015 | Kubo |
| 2016/0040984 A1* | 2/2016 | Byrne .................. G01B 11/16 348/92 |
| 2017/0109931 A1 | 4/2017 | Knorr et al. |
| 2017/0154462 A1 | 6/2017 | Von Cramon |
| 2017/0243374 A1 | 8/2017 | Matsuzawa |

\* cited by examiner

ITERATING DIFFERENT CAMERA REPRESENTATIONS IN THREE-DIMENSIONAL MODEL

CROSS-REFERENCE TO RELATED APPLICATIONS

This application claims the benefit of and priority to U.S. Provisional Patent Application Ser. No. 62/788,069 filed on Jan. 3, 2019 and entitled "ITERATING DIFFERENT CAMERA REPRESENTATIONS IN THREE-DIMENSIONAL MODEL," which application is expressly incorporated herein by reference in its entirety.

BACKGROUND

Cameras can take pictures or video by positioning and orienting the camera towards the area that is to be imaged. A camera control is activated to initiate capture of the image. Cameras typically have a lens system through which the input light passes. An aperture opens to allow the light to pass through to the recording medium. Alternatively, the recording medium is activated to cause it to capture the image that is incident thereon. Traditionally, the medium was film, but modern cameras represent the image digitally as a two-dimensional array of pixel values.

Depth cameras allow for depth information to be captured for each pixel of the camera. For instance, infrared light may be emitted from the camera. The infrared light propagates away from the camera, and reflects off of a surface. Some of that reflected light will reflect right back to each pixel location of the camera. Based on the time that it takes for the emitted light to be received back at each pixel location, and based on the speed of light, the distance to objects can be estimated for each pixel location. That information may then be used to perform object recognition.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the evaluation of multiple virtual camera representations at the same point-of-view within a three-dimensional environment without recalculating a light travel transform that represents how light travels and reflects within the three-dimensional environment. These virtual camera representations may include a light capture transform that represents a transform from camera input to camera output. The virtual camera representation may also include a vision algorithm for interpreting the camera output. Thus, different virtual camera representations at the same point-of-view may be used to obtain a variety of representations of the three-dimensional environment at the same point-of-view.

Thus, the camera input may be calculated just once, thereby allowing many virtual camera representations (a light capture transform of a camera and/or a vision algorithm that evaluates the camera output) to be applied. This is important as the determination of camera input may take considerable time and processing resources, whereas the post-processing associated with changing (and analyzing) various camera settings and/or vision algorithms may take much less time and resources. Thus, the design and testing of a camera and/or vision component may be greatly accelerated.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Therefore, these drawings depict only example embodiments of the invention and are not therefore to be considered to be limiting of the scope of the invention. With this in mind, example embodiments of the invention will be described and explained with reference to the accompanying drawings in which.

DETAILED DESCRIPTION

At least some embodiments described herein relate to the evaluation of multiple virtual camera representations at the same point-of-view within a three-dimensional environment without recalculating a light travel transform that represents how light travels and reflects within the three-dimensional environment. These virtual camera representations may include a light capture transform that represents a transform from camera input to camera output. The virtual camera representation may also include a vision algorithm for interpreting the camera output. Thus, different virtual camera representations at the same point-of-view may be used to obtain a variety of representations of the three-dimensional environment at the same point-of-view.

Thus, the camera input may be calculated just once, thereby allowing many virtual camera representations (a light capture transform of a camera and/or a vision algorithm that evaluates the camera output) to be applied. This is important as the determination of camera input may take considerable time and processing resources, whereas the post-processing associated with changing (and analyzing) various camera settings and/or vision algorithms may take much less time and resources. Thus, the design and testing of a camera and/or vision component may be greatly accelerated.

First, as basic foundation, the representation of a three-dimensional environment that uses a model will be described with respect to FIG. 1A. Then, the use of multiple virtual camera representation within that virtual environment based on single camera input will be described with respect to FIGS. 1B and 3. Then, the principles of iterating camera input through multiple virtual camera representations will be described with respect to FIGS. 3 through 5. Finally, because components described herein may operate by a computing system, a computing system will then be described with respect to FIG. 6.

Figure 1A:
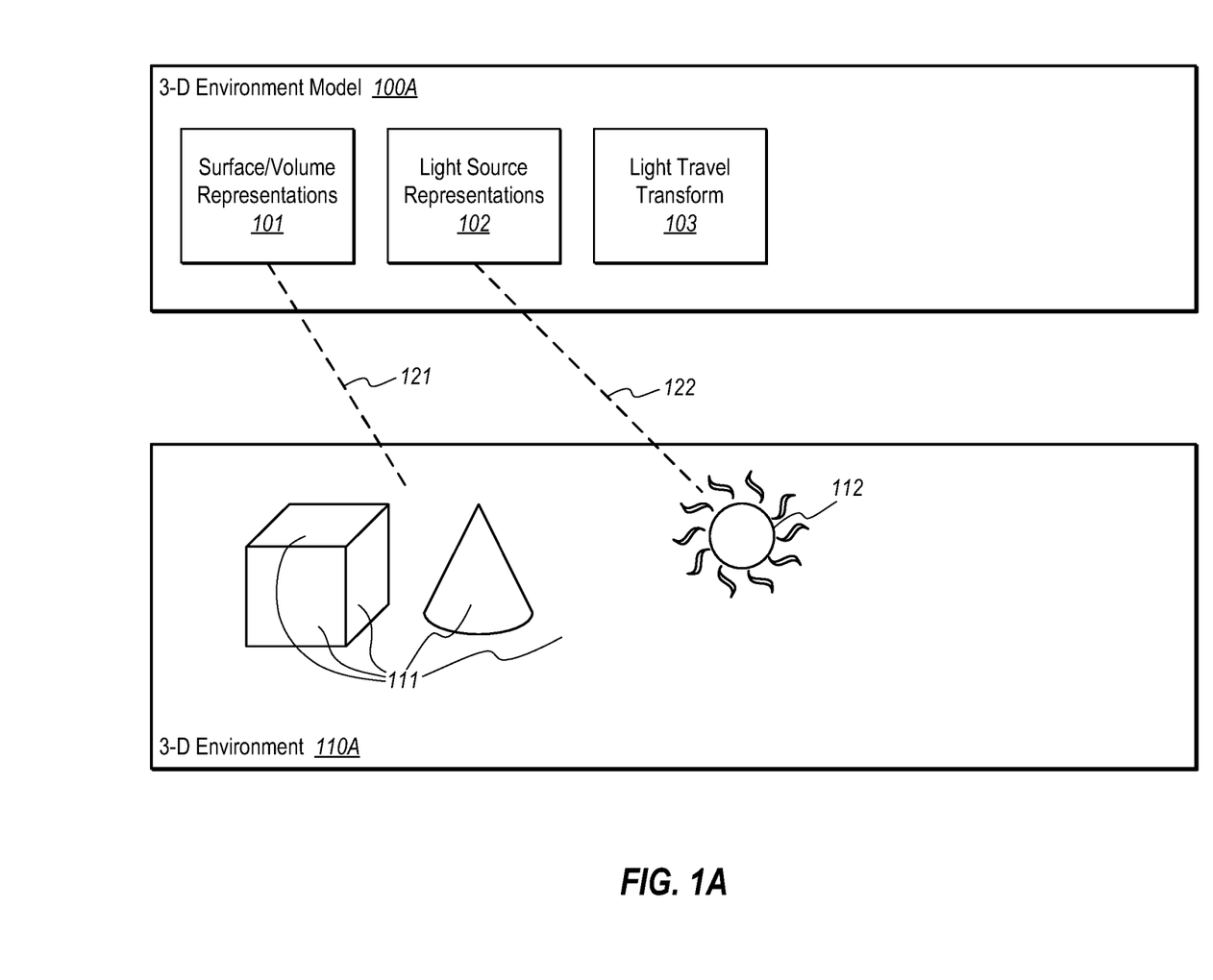
FIG. 1A illustrates a three-dimensional environment model that represents a three-dimensional environment, and which includes surface/volume representations, light source representation(s), and a light travel transform.

FIG. 1A illustrates a three-dimensional environment model 100A that represents a three-dimensional environment 110A. The three-dimensional environment model 100A is a digital representation of the three-dimensional environment 110A such that a computing system may render and/or interpret the three-dimensional environment 110A using the three-dimensional environment model 100A. For instance, that computing system may be a computing system that is structured like the computing system 600 described below with respect to FIG. 6.

The three-dimensional environment 110A is thus a simulated environment. For instance, video games often use simulated environments. However, when discussing the contents and function of a simulated environment (such as light sources, lights, surfaces, volumes, spaces, environments, cameras, and so forth), such contents and functions are only simulated contents and functions. Nevertheless, to avoid convoluting this description, the contents and function of the three-dimensional environment will sometimes be described without using the modifier "simulated". It is understood that the three-dimensional environment is not an actual three-dimensional space.

In FIG. 1A, as represented by dashed line 121, the three-dimensional environment model 100A includes surface/volume representations 101 of surfaces and/or volumes 111 of the three-dimensional environment 110A. The surface/volume representation may include characteristics of a surface such as the texture, material, reflectivity, color (and so forth) of a surface; or the material, translucency, color, distortion, light filtering characteristics (and so forth) of a volume.

FIG. 1A illustrates a very simple three-dimensional environment 110A just to introduce the reader to various types of parts of the three-dimensional environment 110A. For instance, three-dimensional environment 110A includes a few elementary shapes including a cube and a cone. However, this is only for purposes of providing an example that is simple. That said, the principles described herein may be applicable to any three-dimensional environment regardless of how complex. For instance, the principles described herein may be applicable to three-dimensional environments that include thousands, millions, billions (and so forth) different surfaces and volumes. An example of a complex three-dimensional environment might be a high-resolution simulated environment of the entire Earth or an entire real or imaginary world of any type.

As represented by dashed line 122, the three-dimensional environment model 100A also includes a light source representation 102 of at least one light source 112 in the three-dimensional environment 110A. In this simple example, the light source 112 is a sun-like light source. However, the light source may be any light source at any position. Furthermore, more complex three-dimensional environments may have multiple light sources. The principles described herein are applicable regardless of the number or types of light sources within the simulated three-dimensional environment. The light source representation 102 may specify the position and intensity of the light source, as well as the light characteristics that are simulated to be emitted by the light source.

The three-dimensional environment model 100A also includes a light travel transform 103, which represents how light travels within the three-dimensional environment 110A. Light travel transforms are known in the art of simulated three-dimensional environments. Nevertheless, as examples, a light travel transform may dictate how light is reflected from, absorbed by, distorted by, and/or refracted by, a particular surface or volume given one or more parameters of the volume, surface or light. Since the three-dimensional environment is simulated, the light travel transform need not actually follow the rules of optical physics that we observe in the real world, although doing so will make the simulated three-dimensional environment appear more realistic. Given the applicable light source representation(s) and the light travel transform, the computing system may determine what light is apparent at any given point in the three-dimensional environment, and the direction of propagation of that light.

Figure 1B:
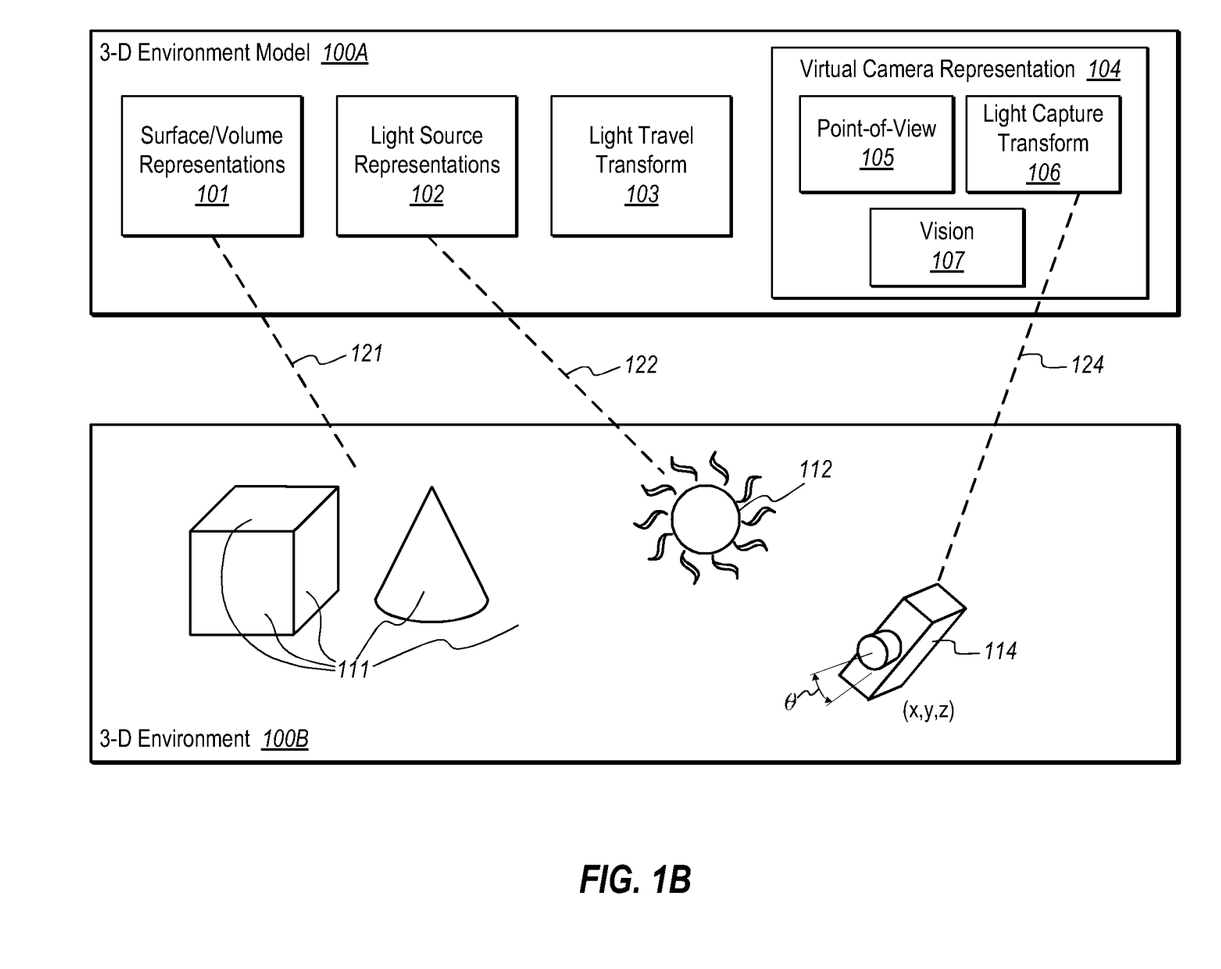
FIG. 1B illustrates a three-dimensional environment model that is the same as the three-dimensional environment model of FIG. 1A, except for the addition of a camera representation.

FIG. 1B illustrates a three-dimensional environment model 100B that is the same as the three-dimensional environment model 100A of FIG. 1A, except for the addition of a virtual camera representation 104. The three-dimensional environment 110B of FIG. 1B is the same as the three-dimensional environment 110A of FIG. 1A except for the addition of the camera 114 positioned at point (x,y,z) and oriented at angle Θ within the three-dimensional environment.

As represented by dashed line 124, the virtual camera representation 104 represents the camera 114, as well as potentially a vision component 107 that evaluates the camera output using a vision algorithm. The vision component 107 may be structured as described for the component 606 of FIG. 6.

The camera representation 104 also includes a point-of-view representation 105 and a light capture transform 106. The point-of-view representation 105 represents the point of view of the corresponding camera 114 and includes the simulated position (x,y,z) as well as the angle of orientation Θ. The light capture transform 106 is a transform from the camera input to the camera output for the corresponding camera. For instance, the light capture transform 106 might represent a camera with a particular shutter speed.

Figure 2:
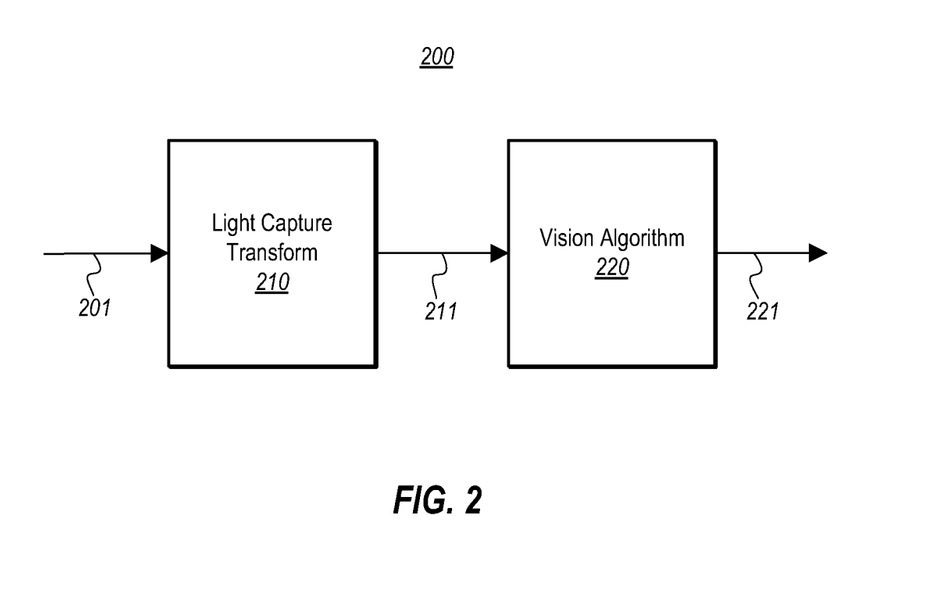
FIG. 2 illustrates operation of an example virtual camera representation, with camera input being fed to a light capture transform, which results in a camera output then being provided to a vision algorithm, the virtual camera representation outputting a representation of a point-of-view in the three-dimensional environment.

For instance, FIG. 2 illustrates camera input 201 (input light) being fed to a light capture transform 210, which results in a camera output 211 (e.g., an image). Note that the image is an actual image of a simulated environment. The camera 114 may be thought of as a "virtual camera" since it does not physical exist, but is only simulated to be present within a simulated three-dimensional environment. Optionally, the camera output 211 is provided to a vision algorithm 220, which analyzes the camera output 211. For instance, the vision algorithm 220 may be implemented by the vision component 107 of FIG. 1A.

Figure 3:
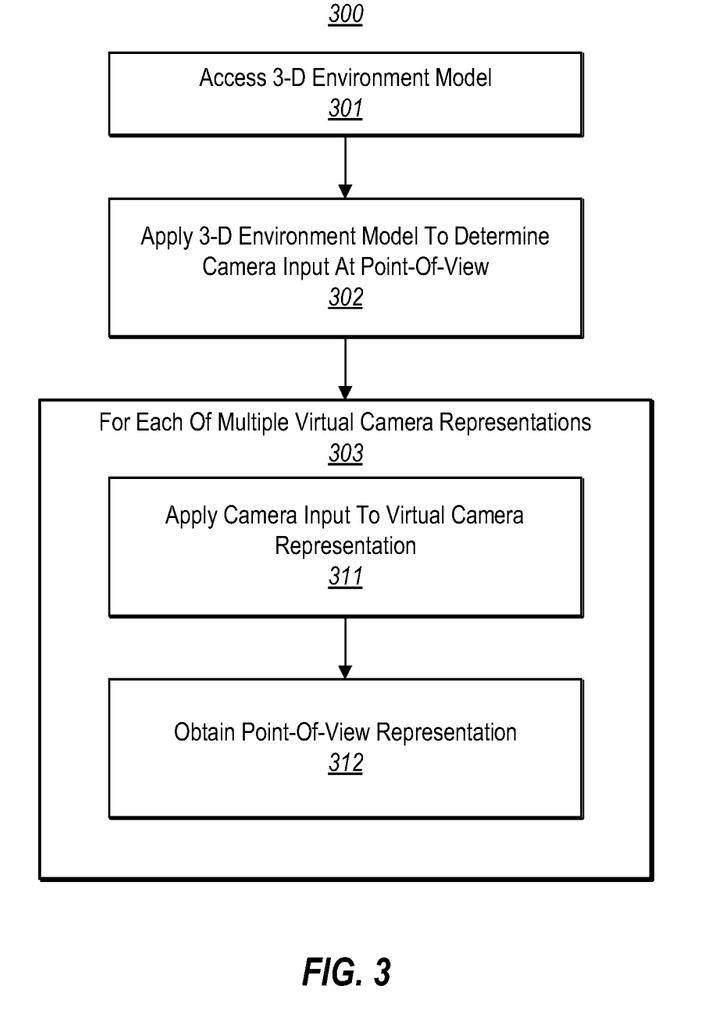
FIG. 3 illustrates a flowchart of a method of evaluating multiple virtual camera representations at the same point-of-view within a three-dimensional environment represented by a three-dimensional environment model without recalculating a light travel transform that represents how light travels and reflects within the three-dimensional environment.

FIG. 3 illustrates a flowchart of a method 300 of evaluating multiple virtual camera representations at the same point-of-view within a three-dimensional environment represented by a three-dimensional environment model. In accordance with the principles described herein, this may be performed without recalculating a light travel transform that represents how light travels and reflects within the three-dimensional environment. The method 300 of FIG. 3 will now be described with respect to FIG. 3, and with reference to all of the previous figures. The method 300 may be performed by a computing system, such as the computing system 600 described below with respect to FIG. 6.

The method 300 includes accessing a three-dimensional environment model (act 301). For instance, the computing system 600 may access the three-dimensional environment model 100A of FIG. 1A, or the three-dimensional model 100B of FIG. 1B. The computing system 600 then applies the three-dimensional environment model to determine camera input at a point-of-view using the light source representation and the light travel transform (act 302). For instance, referring to FIG. 1B, the computing system 600 may use the surface/volume representations 101 and the light source representation 102 to determine the camera input present at position (x,y,z) and orientation ⊖. Referring to FIG. 2, this camera input may be represented by arrow 201. In accordance with the principles described herein, this camera input 201 may be used for various virtual camera representations, without recalculating the camera input 201.

Then for each of multiple virtual camera representations (box 303), the computing system 600 then causes the same camera input to be provided to the corresponding light capture transform (act 311), resulting in the virtual camera representation outputting a point-of-view representation of the three-dimensional environment (act 312). For instance, FIG. 2 illustrates the virtual camera representation 200. The virtual camera representation includes the light capture transform 210 that, when applied to the camera input 201, generates camera output 211. Optionally, the virtual camera representation 200 may also include the vision component 220 that interprets the camera output 221.

The point-of-view representation might be, for example, an image, or more broadly a two-dimensional array of properties of the three-dimensional environment. In the case of a still camera, there might be a single two-dimensional array. In the case of a video camera, there might be multiple two-dimensional arrays, each representing a different point in time. But in any case, the point-of-view representation may include at least one two-dimensional array of properties of the three-dimensional environment as measured at the point-of-view of the camera.

Figure 4:
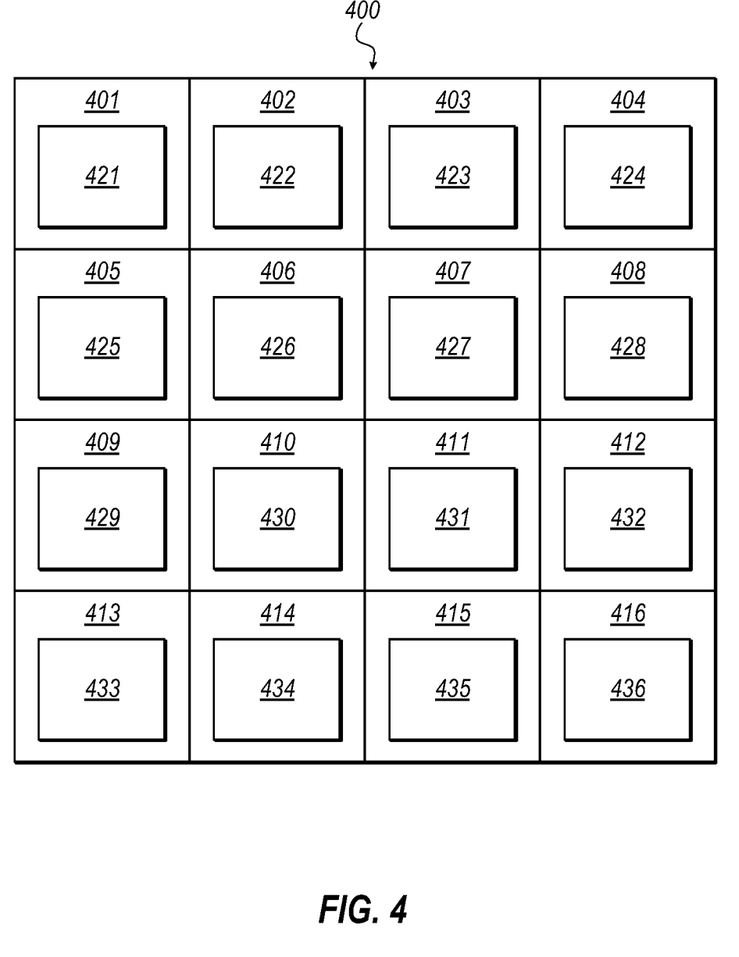
FIG. 4 illustrates a simple two-dimensional array of estimated properties obtained by the method of FIG. 3.

FIG. 4 illustrates a simple two-dimensional array 400 of estimated properties obtained by the method 300 of FIG. 3, and represents an example of the point-of-view representation 221 of FIG. 2. In this example, the two-dimensional array is a simple 4×4 array having locations 401 through 416. However, this is for purposes of simplicity. In one embodiment, the two-dimensional array corresponds to the pixel resolution, such that each camera pixel has an associated estimated property. In the simple example of FIG. 4, each location 401 through 416 of the two-dimensional array 400 includes corresponding estimated properties 421 through 436.

The estimated properties could include any estimated properties including light intensity, and light color (e.g., wavelength characteristics). In that case, if the estimated properties were captured at the pixel level, a higher resolution image of the simulated three-dimensional environment may be captured. Alternatively or in addition, the estimated properties might include estimated distances. For instance, for each pixel (or group of pixels), the two-dimensional array may have an estimated distance to the object that reflected light emitted from the camera. As an example, the virtual camera might be a time-of-flight camera, such that when the camera representation was added with the particular point-of-view, an infrared light source was also added at that same position and emitted at the same angle. That time-of-flight camera may capture reflected light of that same wavelength, and determine (based upon the speed of light), how far the object is at each pixel location. As an example, the distances may be determined using a vision component that receives the camera output.

Thus, the principles described herein allow a camera having a particular light capture transform to be tested in a simulated three-dimensional environment. This may be accomplished without actually building a physical camera prior to testing that camera, and without actually placing that physical camera in a suitable physical environment. Once an appropriate camera with an appropriate light capture transform is found, then perhaps at that point a physical camera having that same light capture transform may be physically created, with higher confidence that the resulting camera will function as intended. In case a vision component is used, the operation of the vision component may likewise be tested. Furthermore, since one camera input is used to test multiple virtual camera representations, there may be many virtual camera representations that are efficiently tested. For instance, there may be a camera that has multiple shutter settings, each represented by a different virtual camera representation. The camera may be quickly tested with each of those shutter settings.

Figure 5:
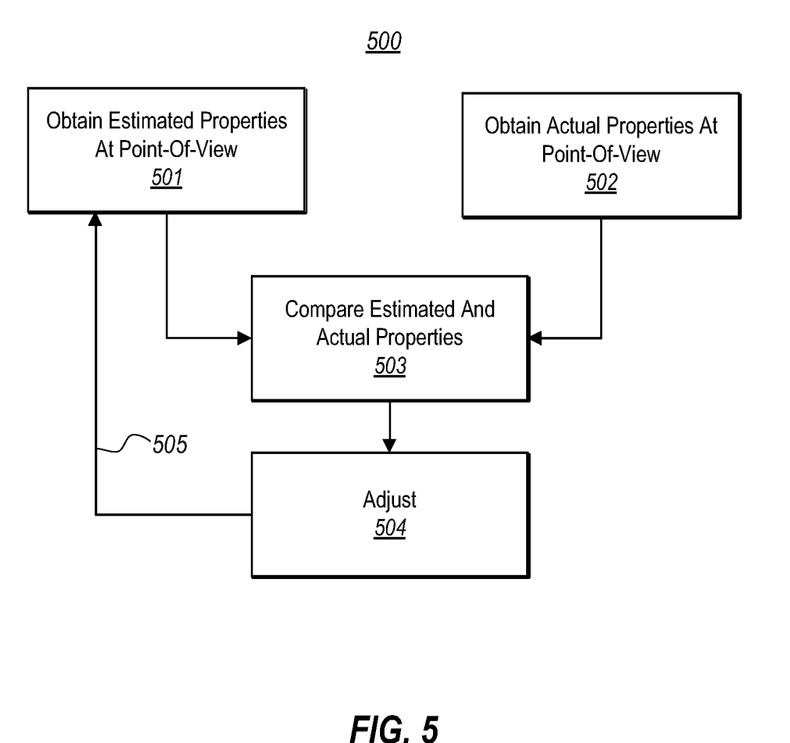
FIG. 5 illustrates a flowchart of a method of tuning capture of the point-of-view representation.
Figure 6:
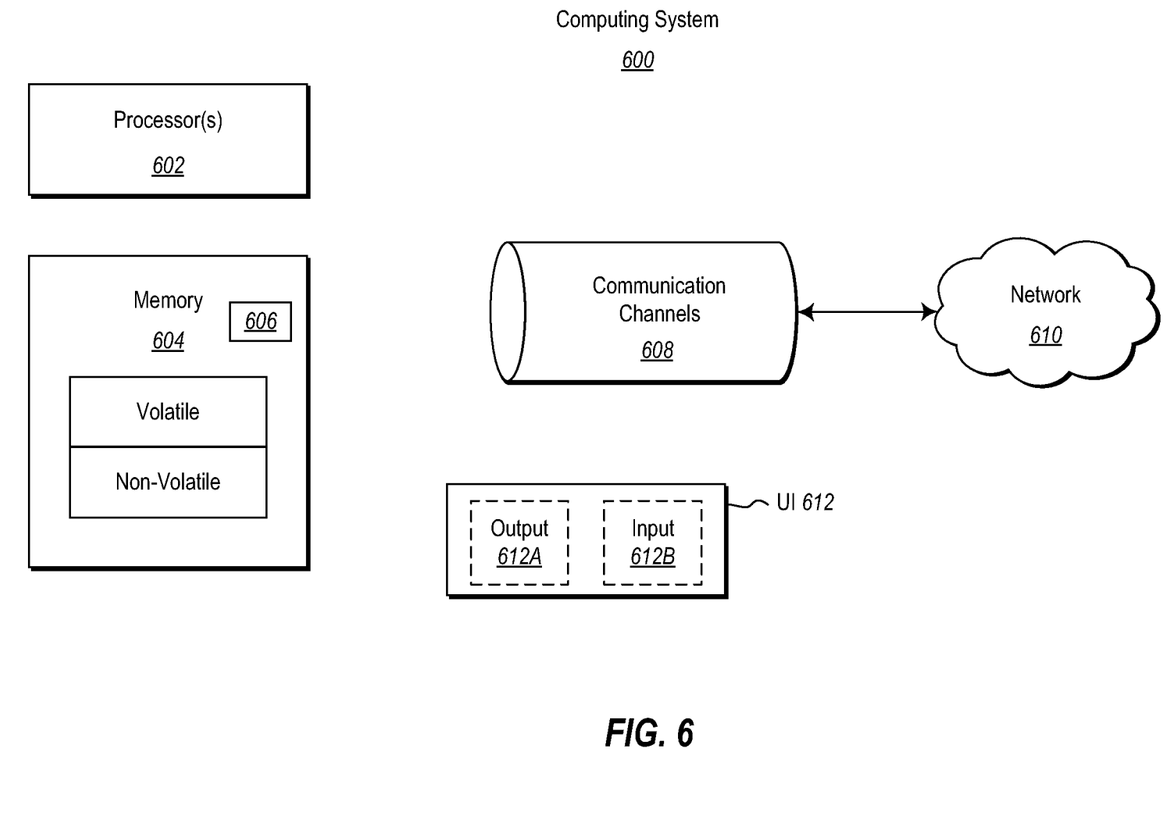
FIG. 6 illustrates an example computer system in which the principles described herein may be employed.

In one embodiment, the capture of the point-of-view representation may be tuned. FIG. 5 illustrates a flowchart of a method 500 for tuning capture of the point-of-view representation. The computing system 600 obtains at least one two-dimensional array of estimated properties of the three-dimensional environment at the point-of-view (act 501). This may be accomplished by performing the method 300 of FIG. 3. In additional, the computing system 600 obtains the actual properties of the three-dimensional environment at the same point-of-view (act 502).

For instance, if the estimated properties were intensity and/or color, the computing system already computed the camera input at each location of the two-dimensional array. If the estimated properties are distances, the computing system can calculate the actual distance from the appropriate surface to the camera at the point-of-view corresponding to each pixel location. Thus, in addition to the estimated properties for each location of the two-dimensional array, the computing system 600 can determine what the values of the property actually should be at the different locations of the two-dimensional array.

The computing system 600 then compares the two-dimensional array of estimated properties with the two-dimensional array of actual properties (act 503). In the case of a video camera, perhaps this is done for each two-dimensional array composing the moving image. Based on this comparison, the capture may be adjusted so as to reduce the difference between the two-dimensional array of estimated properties and the two-dimensional array of actual properties (act 504). This process may involve multiple iterations of method 300 (as represented by arrow 505), where the estimated properties tend to migrate, with each iteration, towards the actual properties.

As an example, the light capture transform may be adjusted to reduce error between the estimated and actual properties. For instance, if the distance is uniformly underestimated by about 10 percent, the light capture transform (or a subsequent vision component) may adjusted to add 10% to all estimated distances. As another example, characteristics of the three-dimensional environment may be adjusted, such as the light source, the surfaces and/or volumes, or the light travel transform. Accordingly, the principles described herein allow for automated, or rapid, tuning of the light capture process (by adjusting the camera, the vision component, and/or the simulated environment) so that the camera output is more accurate.

Because the principles described herein operate in the context of a computing system, a computing system will be described with respect to FIG. 6. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 6, in its most basic configuration, a computing system 600 typically includes at least one hardware processing unit 602 and memory 604. The memory 604 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 600 has thereon multiple structures often referred to as an "executable component". For instance, the memory 604 of the computing system 600 is illustrated as including executable component 606. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 604 of the computing system 600. Computing system 600 may also contain communication channels 608 that allow the computing system 600 to communicate with other computing systems over, for example, network 610.

While not all computing systems require a user interface, in some embodiments, the computing system 600 includes a user interface 612 for use in interfacing with a user. The user interface 612 may include output mechanisms 612A as well as input mechanisms 612B. The principles described herein are not limited to the precise output mechanisms 612A or input mechanisms 612B as such will depend on the nature of the device. However, output mechanisms 612A might include, for instance, speakers, displays, tactile output, holograms, virtual reality, and so forth. Examples of input mechanisms 612B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more computer-readable storage media having thereon computer-executable instructions that are structured such that, when executed by the one or more processors, the computing system is caused to evaluate multiple virtual camera representations within a three-dimensional environment represented by a three-dimensional environment model without recalculating a light travel transform that represents how light travels and reflects within the three-dimensional environment, and wherein the computer system is caused to at least:
access the three-dimensional environment model which is a digital representation of the three-dimensional environment, the three-dimensional environment model including surface or volume representations of three-dimensional surfaces or volumes of the three-dimensional environment, a light source representation of at least one light source in the three-dimensional environment, and a light travel transform representing how light travels and reflects within the three-dimensional environment;

apply the three-dimensional environment model to determine camera input at a point-of-view within the three-dimensional environment using the light source representation and the light travel transform;

for each of multiple virtual camera representations, each having a corresponding light capture transform between camera input and camera output, cause the camera input to be provided to the corresponding light capture transform, resulting in the virtual camera representation outputting a point-of-view representation of the three-dimensional environment.

2. The computing system in accordance with claim 1, each of at least some of the point-of-view representations of the three-dimensional environment including a two-dimensional array of estimated properties of the three-dimensional environment.

3. The computing system in accordance with claim 2, each of at least some of the two-dimensional array of estimated properties including a two-dimensional array of distances.

4. The computing system in accordance with claim 3, the computer-executable instructions, when executed by the one or more processors, further causing the computing system to:

use the three-dimensional model to generate a two-dimensional array of actual distances;

compare the two-dimensional array of estimated distances with the two-dimensional array of actual distances; and based on the comparison, adjust altering of the virtual camera representation so as to reduce a difference between the two-dimensional array of estimated distances and the two-dimensional array of actual distances.

5. The computing system in accordance with claim 2, each of at least some of the two-dimensional array of estimated properties including a two-dimensional array of intensities.

6. The computing system in accordance with claim 2, each of at least some of the two-dimensional array of estimated properties including a two-dimensional array of colors.

7. The computing system in accordance with claim 2, the computer-executable instructions, when executed by the one or more processors, further causing the computing system to:

use the three-dimensional model to generate a two-dimensional array of actual properties;

compare the two-dimensional array of estimated properties with the two-dimensional array of actual properties; and based on the comparison, adjust altering the virtual camera representation so as to reduce a difference between the two-dimensional array of estimated properties and the two-dimensional array of actual properties.

8. The computing system in accordance with claim 1, at least some of the virtual camera representations having a different light capture transform.

9. The computing system in accordance with claim 1, at least some of the virtual camera representations including a vision component.

10. The computing system in accordance with claim 9, wherein for at least some of the virtual camera representations that include a vision component, the vision component is different.

11. The computing system in accordance with claim 1, wherein the multiple virtual camera representations are provided with the camera input in sequence.

12. A method implemented by a computing system for evaluating multiple virtual camera representations within a three-dimensional environment represented by a three-dimensional environment model without recalculating a light travel transform that represents how light travels and reflects within the three-dimensional environment, the computing system having a processor and storage storing computer-executable instructions that, when executed by the at least one processor, cause the computing system to implement the method, the method comprising:

the computing system accessing the three-dimensional environment model which is a digital representation of the three-dimensional environment, the three-dimensional environment model including surface or volume representations of three-dimensional surfaces or volumes of the three-dimensional environment, a light source representation of at least one light source in the three-dimensional environment, and a light travel transform representing how light travels and reflects within the three-dimensional environment;

the computing system applying the three-dimensional environment model to determine camera input at a point-of-view within the three-dimensional environment using the light source representation and the light travel transform;

the computing system, for each of multiple virtual camera representations having a corresponding light capture transform between camera input and camera output, causing the camera input to be provided to the corresponding light capture transform, resulting in the virtual camera representation outputting a point-of-view representation of the three-dimensional environment.

13. The method in accordance with claim 12, each of at least some of the point-of-view representations of the three-dimensional environment including a two-dimensional array of estimated properties of the three-dimensional environment.

14. The method in accordance with claim 13, each of at least some of the two-dimensional array of estimated properties including a two-dimensional array of distances.

15. The method in accordance with claim 14, further comprising:

using the three-dimensional model to generate a two-dimensional array of actual distances;

comparing the two-dimensional array of estimated distances with the two-dimensional array of actual distances; and based on the comparison, adjusting altering the virtual camera representation so as to reduce a difference between the two-dimensional array of estimated distances and the two-dimensional array of actual distances.

16. The method in accordance with claim 13, further comprising:

using the three-dimensional model to generate a two-dimensional array of actual properties;

comparing the two-dimensional array of estimated properties with the two-dimensional array of actual properties; and based on the comparison, altering the virtual camera representation so as to reduce a difference between the two-dimensional array of estimated properties and the two-dimensional array of actual properties.

17. The method in accordance with claim 16, wherein the multiple virtual camera representations are provided with the camera input in sequence, at least some of which being chosen to be the altered virtual camera representation of the prior virtual camera representation.

18. The method in accordance with claim 12, at least some of the virtual camera representations having a different light capture transform.

19. The method in accordance with claim 12, at least some of the virtual camera representations including a vision component, wherein for at least some of the virtual camera representations that include a vision component, the vision component is different.

20. A computer program product comprising one or more computer-readable hardware storage devices having stored computer-executable instructions that are executable by one or more processors of a computing system for causing the computing system to evaluate multiple virtual camera representations at a same point-of-view within a three-dimensional environment represented by a three-dimensional environment model without recalculating a light travel transform that represents how light travels and reflects within the three-dimensional environment, and by at least causing the computing system to:

access the three-dimensional environment model which is a digital representation of the three-dimensional environment, the three-dimensional environment model including surface or volume representations of three-dimensional surfaces or volumes of the three-dimensional environment, a light source representation of at least one light source in the three-dimensional environment, and a light travel transform representing how light travels and reflects within the three-dimensional environment;

apply the three-dimensional environment model to determine camera input at a point-of-view within the three-dimensional environment using the light source representation and the light travel transform;

for each of multiple virtual camera representations, each having a corresponding light capture transform between camera input and camera output, cause the camera input to be provided to the corresponding light capture transform, resulting in the virtual camera representation outputting a point-of-view representation of the three-dimensional environment.

* * * * *